US00RE47247E

(19) United States
(12) Reissued Patent
Cai

(10) Patent Number: US RE47,247 E
(45) **Date of Reissued Patent: *Feb. 19, 2019**

(54) ONE CARD SYSTEM

(71) Applicant: CINA SOLUTIONS INC., Palo Alto, CA (US)

(72) Inventor: Yinzi Cai, Palo Alto, CA (US)

( * ) Notice: This patent is subject to a terminal disclaimer.

(21) Appl. No.: 14/813,038

(22) Filed: Jul. 29, 2015

Related U.S. Patent Documents

Reissue of:
(64) Patent No.: 8,498,936
Issued: Jul. 30, 2013
Appl. No.: 12/736,289
PCT Filed: May 7, 2009
PCT No.: PCT/US2009/002837
§ 371 (c)(1),
(2) Date: Sep. 27, 2010
PCT Pub. No.: WO2009/137076
PCT Pub. Date: Nov. 12, 2009

U.S. Applications:
(60) Provisional application No. 61/126,966, filed on May 7, 2008.

(51) Int. Cl.

| | |
|---|---|
| ***G06Q 40/00*** | (2012.01) |
| ***G06Q 20/10*** | (2012.01) |
| ***G06Q 20/34*** | (2012.01) |
| ***G07F 7/10*** | (2006.01) |
| ***G07F 7/08*** | (2006.01) |

(52) U.S. Cl.
CPC ..... *G06Q 20/105* (2013.01); *G06Q 20/341* (2013.01); *G06Q 20/3552* (2013.01); *G06Q 20/3572* (2013.01); *G07F 7/0886* (2013.01); *G07F 7/10* (2013.01); *G07F 7/1008* (2013.01)

(58) Field of Classification Search
CPC ..... G06Q 20/105; G06Q 20/341; G06Q 20/3552; G06Q 20/3572; G07F 7/0886; G07F 7/10; G07F 7/1008
See application file for complete search history.

(56) References Cited

U.S. PATENT DOCUMENTS

| | | | |
|---|---|---|---|
| 6,742,704 | B2 | 6/2004 | Fitzmaurice et al. |
| 7,072,864 | B2 | 7/2006 | Brake et al. |
| 7,334,732 | B2 | 2/2008 | Cooper et al. |
| 7,353,988 | B1 * | 4/2008 | Ramachandran ..... 235/379 |
| 8,255,323 | B1 | 8/2012 | Casey et al. |
| 8,364,590 | B1 | 1/2013 | Casey et al. |
| 8,459,544 | B2 | 6/2013 | Casey et al. |
| 8,498,936 | B2 | 7/2013 | Cai |

(Continued)

FOREIGN PATENT DOCUMENTS

| | | | |
|---|---|---|---|
| JP | 2003162682 | A | 6/2003 |
| KR | 1020010112824 | A | 12/2001 |

(Continued)

OTHER PUBLICATIONS

Co-pending U.S. Appl. No. 14/813,043, filed Jul. 29, 2015.

(Continued)

*Primary Examiner* — Joseph A Kaufman
(74) *Attorney, Agent, or Firm* — Haverstock & Owens LLP

(57) ABSTRACT

This invention relates to a novel system which includes a new device (the DEVICE) and a new business process (the PROCESS) that combines multiple cards (for both financial and non-financial transactions) into one card in a secured manner.

69 Claims, 2 Drawing Sheets

(56) References Cited

U.S. PATENT DOCUMENTS

| | | | | |
|---|---|---|---|---|
| 8,628,012 | B1 | 1/2014 | Wallner | |
| 8,690,059 | B1 | 4/2014 | Wallner | |
| 8,814,046 | B1 | 8/2014 | Wallner | |
| 8,832,465 | B2 | 9/2014 | Gulati et al. | |
| 8,870,081 | B2 | 10/2014 | Olson et al. | |
| 8,876,011 | B2 | 11/2014 | Olson et al. | |
| 8,998,096 | B2 | 4/2015 | Brown | |
| 9,010,646 | B2 | 4/2015 | Brown | |
| 9,010,651 | B2 | 4/2015 | Parashar et al. | |
| 2005/0247797 | A1* | 11/2005 | Ramachandran | 235/492 |
| 2007/0214093 | A1* | 9/2007 | Colella | 705/67 |
| 2007/0226140 | A1* | 9/2007 | Erikson | G06Q 10/10 705/41 |
| 2008/0005559 | A1* | 1/2008 | Johnson | G06Q 20/355 713/159 |
| 2008/0059379 | A1* | 3/2008 | Ramaci | G06Q 20/105 705/66 |
| 2010/0078471 | A1 | 4/2010 | Lin et al. | |
| 2010/0078472 | A1 | 4/2010 | Lin et al. | |
| 2010/0082445 | A1 | 4/2010 | Hodge et al. | |
| 2010/0082447 | A1 | 4/2010 | Lin et al. | |
| 2010/0082481 | A1 | 4/2010 | Lin et al. | |
| 2012/0298757 | A1* | 11/2012 | Kim | G06K 19/0718 235/487 |
| 2012/0307451 | A1 | 12/2012 | Shukla et al. | |
| 2013/0085941 | A1 | 4/2013 | Rosenblatt et al. | |
| 2013/0110709 | A1 | 5/2013 | Hodge et al. | |
| 2013/0124319 | A1 | 5/2013 | Hodge et al. | |
| 2013/0179351 | A1 | 7/2013 | Wallner | |
| 2013/0317835 | A1 | 11/2013 | Mathew | |
| 2013/0320081 | A1 | 12/2013 | Olson et al. | |
| 2014/0019367 | A1 | 1/2014 | Khan et al. | |
| 2014/0092571 | A1 | 4/2014 | Trzaskos et al. | |
| 2014/0214640 | A1 | 7/2014 | Mallikarjunan et al. | |
| 2015/0016694 | A1 | 1/2015 | Kerr | |
| 2015/0016697 | A1 | 1/2015 | Kerr | |
| 2015/0016698 | A1 | 1/2015 | Kerr | |
| 2015/0065107 | A1 | 3/2015 | Dave et al. | |
| 2015/0073983 | A1 | 3/2015 | Bartenstein et al. | |
| 2015/0127549 | A1 | 5/2015 | Khan | |
| 2015/0127550 | A1 | 5/2015 | Khan | |
| 2015/0134513 | A1 | 5/2015 | Olson et al. | |
| 2015/0161497 | A1 | 6/2015 | Olson et al. | |
| 2015/0161498 | A1 | 6/2015 | Olson et al. | |
| 2015/0161587 | A1 | 6/2015 | Khan et al. | |
| 2015/0170014 | A1 | 6/2015 | Olson et al. | |

FOREIGN PATENT DOCUMENTS

| | | | |
|---|---|---|---|
| KR | 1020030030235 | A | 4/2003 |
| KR | 1020050105432 | A | 11/2005 |

OTHER PUBLICATIONS

U.S. Appl. No. 12/736,289 Office Action dated Apr. 12, 2012.
U.S. Appl. No. 14/813,043 Office Action dated Oct. 6, 2017.
U.S. Appl. No. 14/813,043 Office Action dated Jan. 26, 2018.
PCT, International Search Report dated Dec. 18, 2009, International Patent Application No. PCT/US2009/002837, filed May 7, 2009, Cai, Yinzi, 3 pages.
PCT, Written Opinion of the International Searching Authority dated Dec. 18, 2009, International Patent Application No. PCT/US2009/002837, filed May 7, 2009, Cai, Yinzi, 4 pages.
PCT, International Preliminary Report of Patentability dated Nov. 9, 2010, International Patent Application No. PCT/US2009/002837, filed May 7, 2009, Cai, Yinzi, 5 pages.

* cited by examiner

ONE CARD SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATIONSHIP TO PRIOR APPLICATIONS

This application is [an] *one of two applications for reissue of U.S. Pat. No. 8,498,936, issued Jul. 30, 2013 and filed Sep. 27, 2010 as a national stage entry of* international application *PCT/US2009/002837, filed* [under the PCT] *May 7, 2009*, and claims the benefit of, and priority to, U.S. provisional application No. 61/126,966, filed [$7^{th}$] May *7,* 2008 and titled "a One card system—the device and the process", which [application is] *applications are* hereby incorporated by reference for all allowable purposes. *The additional application for reissue of U.S. Pat. No. 8,498,936 is reissue application Ser. No. 14/813,043 and was filed on Jul. 29, 2015.*

BACKGROUND OF THE INVENTION

Cards (including but not limited to credit cards, such as VISA, MASTERCARD, AMERICAN EXPRESS, bank cards, department store cards, club membership cards, rebate cards, medical/insurance cards, drivers license, calling cards, etc.) are widely used for financial transactions such as payment and cash advance, or other non-financial transactions. An average person carries multiple credit cards and bank cards, along with many other cards in their wallet. Therefore, a system that can combine multiple cards into one card in a secured manner is preferable.

There are numerous patents describing a universal credit card and/or related device and process so that the end user can combine multiple cards into one card. Examples of such patents are U.S. Pat. No. 6,742,704 B2, U.S. Pat. No. 7,072,864 B2, and U.S. Pat. No. 7,334,732 B2. While each of the above patents claims to achieve its goal from technological point of view, they suffer one or more of the following shortcomings:

1) Does not have the true capability to put multiple cards into one card.

2) Does not provide a secure issuing and authentication process to give the counterparty in a transition the confidence a traditional card gives.

3) Card may be too bulky or fragile to work with existing business infrastructure systems, such as point of sale machines (POS) or automated teller machines (ATM).

For example, U.S. Pat. No. 6,742,704 B2 describes a system that allows a single card function as both a credit card, using magnetic stripe, and a club card, using printed information and/or a bar code. The system uses standard card issuing processes with minor modifications to add club card information. Another example is U.S. Pat. No. 7,072,864 B2, which discloses a system that can combine a merchant/service card, with a general use credit card. It functions as a merchant/service card when used with issuing merchant/service providers and as a credit card when used in other places. The system uses standard secure card issuing process. It enables the transition processing system to support both merchant/service card and credit card transition using magnetic stripe.

Yet, both inventions do not have the ability to combine multiple magnetic cards, such as, multiple credit cards, and/or bank cards, to a single card. In addition, when there is a request for a new card or a replacement card or a cancellation, a new physical card will need to be processed and sent to the user. The standard processing time will take many days and sometimes weeks to complete.

U.S. Pat. No. 7,334,732 B2 describes a hardware system to read and store multiple magnetic based cards to a single card. The card has a programmable magnetic stripe and embedded screen, power source, display and input device to allow user find and select one account, then program the account information to the magnetic stripe. Even though it may be possible to make such an integrated device technology-wise, it will be difficult to fit the system with batteries and LCD display in a standard credit card size that's robust enough for daily use in an existing POS or ATM machine. Furthermore, this invention lacks the secured process to add card information onto the system to give the issuing banks confidence to endorse such an invention. Without endorsement from issuing banks, it is also difficult for the merchants to accept such a card and accept such payment since the card created by this application may not be authorized by the original issuing institute. It not only doesn't look like a traditional credit card, it may also lack authority the original card carries.

In order to resolve these deficiencies, it has become apparent that a new system consisting of a new device and a new business process that can truly combine multiple cards into one card in a more secure manner and can be accepted by merchants with confidence and will be endorsed by issuing banks is highly desirable.

Moreover, it is important that the one card has the same size and look of any existing credit or bank ATM cards, so that the card can be used in current card readers at bank's ATMs, and/or at the merchants without requiring changes to the existing infrastructures for financial transactions such as accepting credit card payment at merchant site, depositing check or receiving cash at bank's ATM, or other financial or non financial transactions that are currently performed by various cards.

Furthermore, it is desirable to have a new one card system that has the built-in capability to receive, authenticate, and store all the related account information in a secured manner that can display related account information for users to choose the card for their next transaction. In addition, it is advantageous to have a new business process of processing, delivering, authenticating and activating the new account information that follows the current new and/or replacement card issuing and activation process with added layers of security, so that the counterparties (such as merchants and card issuers) can have the confidence to accept the card and will endorse the product.

It is further desired to have the "card" be issued by an authorized (such as DMV) or a centralized card processor (e.g. FDR, TSYS) with VISA, MASTERCARD, and/or AMERICAN EXPRESS logo on it, as well as user's name, address, etc., for authentication at banks and the merchant sites.

Furthermore, it is advantageous to have a process that allows a faster and easier way for the consumer to add a card or to cancel a card (or in the event of a lost and/or stolen card). Lastly, it is desirable that the new one card system can still be used without system change or upgrade when the merchants and banks upgrade their system to use smart card in the future and do not use magnetic card readers anymore.

SUMMARY OF THE INVENTION

This invention relates to a novel system which includes a new device (the DEVICE) and a new business process (the PROCESS) that combines multiple cards (e.g. credit cards, bank cards, department/retail store cards, and/or club membership cards, medical and insurance cards, rebate cards, identification cards, etc.) into one card in a secured manner. The DEVICE in this invention can be either a stand alone device or be incorporated into any widely used portable electronic equipment—such as cell phones, PDAs, etc. with added features and functionalities. Specifically, it has the built-in capability to receive, authenticate, and store all related account information in a secured manner via the PROCESS. It can also display related account information for users to choose the card for their next transaction. In the example of the DEVICE being combined with a cell phone, the phone becomes the wallet that acquires the capability to hold all necessary plastic cards.

With the current card reader infrastructure, the DEVICE may include a CARD that has the same size and look of any existing credit or bank ATM cards with a magnetic stripe on the back, and can be used in any current card reader at bank's ATMs, or merchants' POS. The DEVICE can write related account information stored in the DEVICE onto the CARD's magnetic stripe in a secured manner. The DEVICE or the CARD may also use smart card technology in place of magnetic stripe to perform the transactions.

This invention also includes a new business process (the PROCESS) to register the DEVICE, to request adding a new card, processing a replacement card, or canceling a card, to deliver, authenticate and activate a new or replacement card, and to store and display the account information on the DEVICE, etc. The PROCESS of processing, delivering, authenticating and activating the new or replacement account is consistent with the current new/replacement card processing with additional layers of security. The PROCESS also includes secured information transmissions between card issuers and the DEVICE, and between the DEVICE and the CARD.

Compared to the other patents with the similar objectives, our invention is unique and superior to all the prior arts. The main differences and benefits of this invention are one or more of the following: It has the ability to truly combine multiple cards (e.g. credit cards, bank cards, department/retail store cards, and/or club membership cards, medical/insurance cards, rebate cards, identification cards, etc.) into one card in a secured manner, so that the "one card" can be accepted by merchants with confidence and will be endorsed by issuing banks.

The CARD in this invention has the same size and look of any existing credit or bank ATM cards. The CARD can be used in current card readers at bank's ATMs, and/or at the merchants—with no batteries in the card, or LCD display on the card. It does not require changes to the existing infrastructures for accepting payment, depositing check/receiving cash, or other financial transactions that's currently performed by credit or debit cards;

For authentication at banks and the merchant sites, the CARD can be issued by an authorized (such as DMV) or a centralized card processor (e.g. FDR, TSYS) with VISA, MASTERCARD, and/or AMERICAN EXPRESS logo on it, as well as the user's name, address, etc.

The PROCESS of processing, delivering, authenticating and activating the new account information follows the current new and/or replacement card issuing and activation process with additional layers of security. Customers are not required to register with the "Host System" with their financial data such as credit card or bank account information, which can create potential fraud and huge financial liabilities. Throughout the information transmission processes, the "Host System" is not required to have access to, to store or to transmit unencrypted account information. The PROCESS described in this invention will allow a consumer to add or to cancel a card (or in the event of a lost and/or stolen card) in a matter of minutes or hours instead of days or weeks. Smart card technology can be used on the DEVICE without system change or upgrade.

BRIEF DESCRIPTION OF THE DRAWINGS

FIG. 1 is a drawing of the DEVICE and the CARD

Figure 1A:
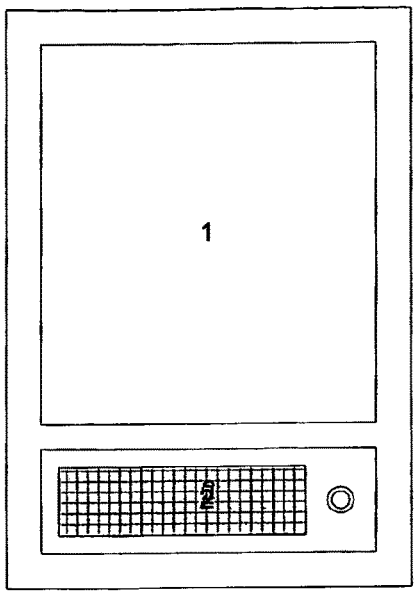
FIG. 1a is a drawing illustrating the front view of the DEVICE. .
Figure 1B:
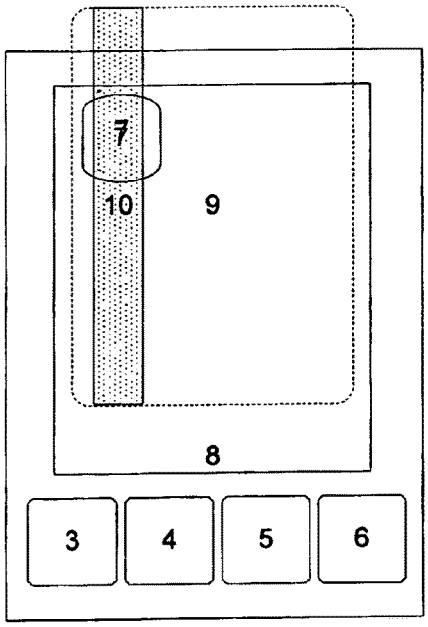
FIG. 1b is a drawing illustrating the inside view of the DEVICE and the CARD.
Figure 1C:
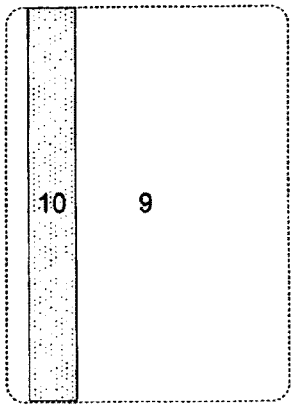
FIG. 1c is a drawing illustrating of the CARD.
Figure 1D:
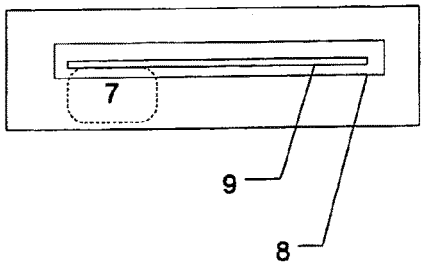
FIG. 1d is a drawing illustrating the top view of the DEVICE with CARD.
Figure 2:
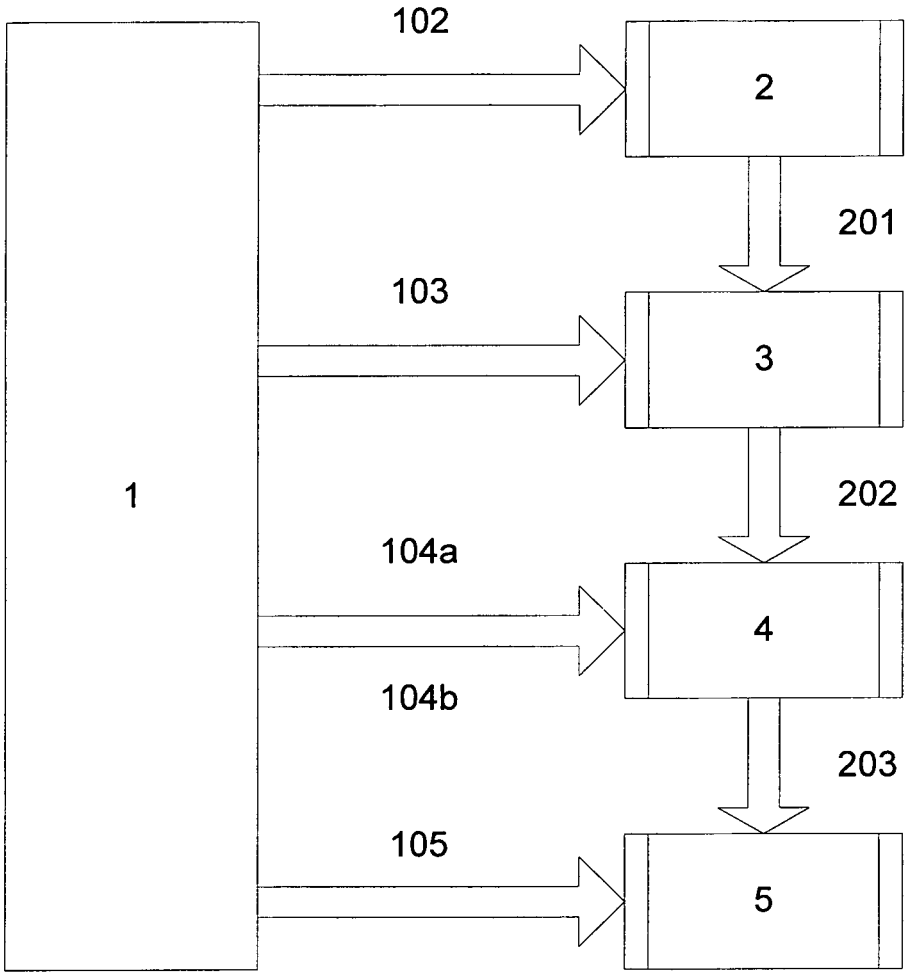

Entities (FIG. 1):

1. a display; 2. an input mechanism; 3. a DEVICE ID; 4. a communication sub system; 5. a non-volatile storage; 6. a CPU, or other integrated computer system; 7. a magnetic strip writer; 8. a card storage slot; 9. a card; 10. a magnetic strip FIG. 2 is a drawing illustrating the interactions among the customer, the card issuer, the HOST SYSTEM/card processor, the DEVICE and the CARD through the PROCESS.

Entities (FIG. 2):

1. Consumer; 2. Card Issuer; 3. Host System/Card Processor; 4. Device; 5. Card.

Consumer Actions (FIG. 2):

103. Register; 102. Request a card (add a new account onto, or cancel a card from the DEVICE, etc.); 104a. Confirm and activate or change the functionality of a new account; 104b. Select a card; 105. Use a card.

Information Flow (FIG. 2):

201. Pass-code encrypted account information; 202. Pass-code encrypted and DEVICE encrypted account information; 203. Re-program the CARD

DETAILED DESCRIPTION OF THE INVENTION

This invention relates to a novel system which includes a new device (the DEVICE) and a new business process (the PROCESS) that combines multiple cards (e.g. credit cards, bank cards, department/retail store cards, and/or club membership cards, medical and insurance cards, rebate cards, identification cards, etc.) into one card in a secured manner.

The Device

The DEVICE in this invention can be either a stand alone device or be incorporated into any widely used portable electronic equipment—such as cell phones, PDAs, etc. with added features and functionalities. Specifically, it has a built-in capability to receive, authenticate, and store all the related account information in a secured manner via the PROCESS. It can display related account information for users to choose the card for their next transaction. In the example of the DEVICE being combined with a cell phone, the phone becomes the wallet and acquires the capability to hold all necessary plastic cards.

1. The DEVICE is an electronic device that is capable of receiving, storing and processing multiple account information in a secured manner using a novel PROCESS (defined later). The device may include or be used in conjunction with a smart card. It may be capable of reprogramming a magnetic stripe card or a smart card.
2. In one general embodiment the DEVICE includes the following components. Each of these components may be used in any combination within a DEVICE:

a) A display. The display can be a LCD screen, as show as 1 in FIG. 1a. It can also be an e-ink display or any other type of display. It will be used for user interaction. It will also display account information in text, symbol, bar code or graphic form.
b) An input mechanism. It could be a keyboard, a pointing device, as shown as 2 in FIG. 1a. It could also be in the form of one or more the following mechanisms: a touch screen, one or more selection/arrow keys/buttons.
c) A unique DEVICE ID to uniquely identify the device in the PROCESS. The ID could be an IMEI (International Mobile Equipment Identity) on a mobile phone SIM card, as shown as 3 in FIG. 1b. It could also be a MAC (Media Access Control) address on a network chip, a CPU id, or any other form of unique identifier available on a hardware component.
d) A communication sub-system to communicate directly or through a computer to the HOST SYSTEM as described in the PROCESS. It could be a mobile data network modem, as shown as 4 in FIG. 1b. It could also be one or more of the following components: a wifi chip, an Ethernet chip, a USB interface, a blue tooth network, or an infrared transmitter/receiver.
e) A non-volatile storage, such as a flash memory chip, as shown as 5 in FIG. 1b. Alternatively one could choose a hard drive, a flash card, or an EPROM. This component is used to store the account information received from the PROCESS.
f) A CPU, as shown as 6 in FIG. 1b, or other integrated or specialized computing system that can process/encode/decode/store/retrieve the account information, handle user/network interaction and control other subsystem.
g) A magnetic stripe writer, as shown as 7 in FIG. 1b and FIG. 1d, to program the CARD. It could be a side slot on one side of the DEVICE that a CARD can swipe through. Alternatively, there could be an opening slot on the DEVICE that the CARD can be pushed into and pulled out, as shown as 8 in FIG. 1b and FIG. 1d. In the latter case, the slot can also be used as a storage for the CARD and a lock/eject mechanism may also be applied.
h) A smart card chip embedded and has the circuitry to program the smart card chip. In this case, the DEVICE itself can function as a smart card.
i) A smart card programmer that can program the CARD with smart card capability (a smart card). Smart card is a technology that uses an integrated circuit chip, instead of a magnetic stripe, to store and communicate with a point of sale (POS) system. The more common form of smart card as wireless technology is to perform touch-less transmission. The smart card can be programmed wirelessly or through electric contact using a smart card program device.
j) The capability to read the unique id of the CARD. It could be a smart card reader if the card has a smart card embedded, an optical scanner if the id is a bar code, or a magnetic stripe reader if the card use a (separate) permanent magnetic stripe to store its id.
k) It may have a clock for process time based dynamic account information.
l) It may have a bio-matrix scanner, such as print scanner for security authentication to operate the DEVICE.
m) A CARD, as shown as 9 in FIG. 1b, FIG. 1c and FIG. 1d, and a "CARD" slot, as shown as 8 in FIG. 1b and FIG. 1d. The CARD will have either a magnetic stripe, as show as 10 in FIG. 1b and FIG. 1c, that works with existing point of sale systems (POS) or ATMs, or a smart chip that works with smart card system. The CARD may have an unique id that can be recognized by the DEVICE, for example, a smart card, bar code or a special magnetic stripe. However, if in the future, the merchant and bank upgrade their system, and do not use a card reader anymore, then the DEVICE in this invention does not need to include the "CARD", since the smart chip can be embedded in the "DEVICE", the user can use the DEVICE without the CARD.

The CARD has the following features:

1). For an additional layer of security, the DEVICE and the CARD may be pre-paired before delivery to the user, or the DEVICE and the CARD can be paired through the PROCESS if the CARD has a unique id. The DEVICE will only write to a paired CARD. This way a user can't use a CARD from one DEVICE with a different DEVICE. When the match is not there, the DEVICE will refuse to write account info onto the CARD—this again is to prevent fraud.

2). For authentication by issuing banks and at merchant sites, the CARD can be issued by an authorized (such as DMV) or centralized card processor (e.g. First Data Corp, Total Systems, etc.) with VISA, MASTERCARD, AMERICAN EXPRESS, and/or other, logos from other authorities onto it, as well as user's name, address, etc.

3). The CARD can be inserted into the DEVICE and with user's selection of the account for the next transaction, related account information can be written from the DEVICE onto the magnetic stripe on the back of the CARD. The CARD can then be used as a "normal" credit or debit card for the user to perform his/her next desired transaction.

4). The CARD can take the form of an ID card with information such as photo, name, and address on the front of the card and at least one magnetic stripe on the back. For example, if combined with a driver license card, the CARD can take the form of the current driver license with an added special magnetic stripe on the back (not to replace the current stripe on the driver license, but an added one on the bottom), onto which the DEVICE to write related account information for financial transactions per user's instruction. Ultimately, when the CARD takes the form of the driver license, the DEVICE becomes a wallet, with the only "CARD" one needs to carry with them!

3. The DEVICE can perform secure transmissions directly with smart card technology or through a CARD by reprogramming its magnetic stripe or its smart card chip. It has the following features:

a) For security, only account information received in a secured manner via the PROCESS can be read, stored, and used by the DEVICE and written onto the CARD.
b) The DEVICE will not accept any user entered account number. This is again to prevent fraud.
c) The DEVICE can't read account information from the CARD's magnetic stripe to retrieve account information or from ANY other cards (credit or bank card) user may choose to insert into the DEVICE, for that matter. This is important as nobody can insert any credit or bank card into the DEVICE and expect the DEVICE to retrieve the account information and store them onto the DEVICE without going through the PROCESS. This is to reduce or eliminate fraudulent activities possible through the one card invention. This feature is also important so that issuing banks are comfortable with account information transmissions.

d) The DEVICE may have a bio-matrix scanner, such as finger print scanner for security authentication to operate the DEVICE.

e) The DEVICE may have the ability to access and display account information with issuing bank for balance, available credit line, APR, payment due dates, etc.

f) The DEVICE can be a hand held item, including but not limited to cell phones, palms, laptop computers, or other electronic devices.

g) The account information stored in the DEVICE can be encrypted to add an additional layer of security in case the DEVICE is lost or stolen. The information can only be retrieved and the functionality can only be activated (for selecting the card to use and to write to the CARD) with correct password, and/or a bio-matrix match.

h) For non-financial institution issued cards (such as Safeway card, Costco card, insurance card, etc.), the user can also add such accounts through the PROCESS onto the DEVICE.

The Process

This invention also includes a new business process to register the DEVICE, to request adding a new card, processing a replacement card, or canceling a card, to deliver, authenticate and activate or change the functionality of a new or replacement card, and to store and display the account information on the DEVICE, etc. The PROCESS of processing, delivering, authenticating and activating the new or replacement account is consistent with the current new/replacement card processing with additional layers of security. The PROCESS also includes secured information transmissions between card issuers and the DEVICE, and between the DEVICE and the CARD.

1. Register (as shown as 103 in FIG. 2) the DEVICE (as shown as 4 in FIG. 2)

a) After obtaining a new DEVICE, a customer (as shown as 1 in FIG. 2) can register the DEVICE with a HOST SYSTEM (as shown as 3 in FIG. 2) and obtain a One Card ID. The HOST SYSTEM here can be any centralized card processor such as FDR, TSYS, a newly created card processor for One-Card System, or any other institution chosen to perform this function. The DEVICE can also be pre-registered.

b) This step is included for added layer of security. It also provides user support and convenience when the DEVICE is lost or stolen. However, the PROCESS in this invention can work without a separate HOST SYSTEM as well.

2. Initiate a request for a new/replacement card (as shown as 102 in FIG. 2)

a) A customer applies for a new card, or a card issuer (as shown as 2 in FIG. 2) issues a replacement card for an existing card (e.g. near the expiration date, or lost/stolen card, etc.);

b) The customer indicates he/she wants to combine the new card with the one-card DEVICE, and provide the card issuer with the One Card ID (if registered with the HOST SYSTEM).

3. Process the request and deliver the new account information a) The card issuer will send the encrypted new account information through the HOST SYSTEM (as shown as 201 in FIG. 2), and/or to the customer directly. It can be sent via mail, by phone, or other communication channels such as the Internet, satellite communication or the cell phone networks, etc.

b) In the example of card issuers sending account information to the customers through the HOST SYSTEM, the card issuer can send the encrypted new account information (pass-code encryption) with the One Card ID to the HOST SYSTEM via a secured private network. The HOST SYSTEM can then add another layer of encryption (device specific encryption with DEVICE ID) and forward the message through the public communication networks such as the Internet, satellite communication or the cell phone networks to the DEVICE (as shown as 202 in FIG. 2). Only when the DEVICE ID on the DEVICE matches with the one sent from the HOST SYSTEM the DEVICE will be able to notify the customer that new account information has arrived from the card issuer. In this case, even if the message from the HOST SYSTEM were to be received by a wrong party, they would not be able to decrypt the account information. In addition, the message to the customer may ask the customer to call the card issuer (similar to the current card activation process for a new credit and/or bank card) to verify and activate or change the functionality of the new card; after verification, the card issuer can provide the customer the pass-code (over the phone, by mail, or other appropriate communication channels) to key into the DEVICE. When the pass-code entered by the customer matches with the key of the encrypted message sent from the card issuer, the new account information can then be decoded and stored into the DEVICE (as shown as 104a in FIG. 2).

c) A separate HOST SYSTEM adds another level of security by guaranteeing that no single institution can generate valid account information for the DEVICE.

4. USE (as shown as 105 in FIG. 2)

a) For more security, all the account information can be stored in the DEVICE in an encrypted form. The account information can only be retrieved or the functionality (such as display the account information, select the card to use and write the related account information onto the CARD (as shown as 5 in FIG. 2) for the next transaction) can only be activated with a correct password, and/or a bio-matrix match.

b) The user can view the account information stored in the DEVICE—it can include but is not limited to the name of issuing bank, current balance on the account, available credit, payment due date, and APR, etc.

c) The user can select the account he/she wants to use for the next transaction (as shown as 104b in FIG. 2).

d) After the user confirms the selection, the related account information will be written onto the magnetic stripe of the CARD or shown as the BAR code on the DEVICE (as shown as 203 in FIG. 2). The user can then use the CARD as a "normal" credit or debit card—whether it's at bank's ATMs for check deposit or cash advance, or at merchants for credit card payment.

After the transaction, the user can put the CARD back into the DEVICE, and all account information becomes encrypted again.

e) The account information stored on the magnetic stripe of the CARD may disappear after a pre-set amount of time or when the CARD is put back into the storage in the DEVICE—in the situation the CARD (or the DEVICE) is lost or stolen, this feature can protect the issuing bank and card user from fraud losses. This is not a required feature for this invention.

f) At the merchants and/or at bank's ATMs that accept the smart card technology, the user can select the account he/she want to use and use the DEVICE for the next transaction with or without the CARD.

5. Lost or Stolen a) Users may follow the current established lost/stolen process by calling each card issuers and request replacement card issuance, or b) For their convenience, when the DEVICE is lost or stolen, user may contact the HOST SYSTEM. With the correct One Card ID and verifications such as name and address match, the HOST SYSTEM can notify the card issuers (for all the cards processed through the HOST SYSTEM via the PROCESS) with the customer One Card ID and customer name and address for card cancellation. The customer will obtain a new DEVICE, register with the HOST SYSTEM again and establish a link between their new DEVICE and their existing One CARD ID, along with their name and address. The HOST SYSTEM can send the card issuers the customer's One Card ID linked with the new DEVICE and request new cards to be processed. Going through the PROCESS again, the user will be able to activate or change the functionality of and use the new cards with their new DEVICE.

6. Cancellation and Account Closure a) If a customer wants to cancel or close an existing account, they can notify the card issuer through the current account closure or cancellation process via phone, email, etc. Or, b) The customer can choose to send an account cancellation request from the DEVICE to the HOST SYSTEM. When the HOST SYSTEM receives the message and if the DEVICE ID matches the customer's One Card ID, the HOST SYSTEM can notify the corresponding card issuer (for the cards processed through the HOST SYSTEM via the PROCESS) with the customer One Card ID and customer name and address for card cancellation.

c) The card issuer will process the cancellation request, and then send an account cancellation notification through the HOST SYSTEM to the DEVICE. After receiving such notice, the DEVICE will notify the customer that the card has been canceled or closed. The customer will have the option of either erasing the account information from the DEVICE or choosing to continue to be able to view the account, but the DEVICE will block the user from selecting the canceled account for any future transactions.

It should be pointed out that the Process of requesting, authenticating, receiving, storing, and activating the account information from the card issuer to the DEVICE is an important element of this invention and is believed to differentiate the invention from the prior art. As explicitly stated, the account information is not transmitted from any actual credit card onto the DEVICE, but rather it has to go through the PROCESS for security reasons. The HOST SYSTEM is there to further facilitate the process. The PROCESS has the following features: 1. It is secure—so that the card issuer and merchant will endorse and accept this invention. It follows the existing card issuing process with additional layer of security. 2. It is fast and convenient—if implemented correctly, the PROCESS of requesting, authenticating, receiving, storing, and activating additional account information should take only a few minutes. In the situation of a lost or stolen card or DEVICE, the customer only need to make one contact with the HOST SYSTEM (if registered), and the establish the link between the new DEVICE ID and the one card ID, all the old accounts will be cancelled and the new card information can be sent to the new DEVICE in a matter of minutes or hours. Today, to request a new card, it takes at least many days, most likely weeks.

Further embodiments of the invention include the following.

1. A system for providing multiple personal authorization information associated with multiple accounts in a single card, the system comprising: (a) a card having the dimensions and functionality of a credit card; the card additionally comprising a first programmable memory (e.g., magnetic stripe, chip & pin, non-volatile memory, etc.) physically associated with the card, the first programmable memory readable by a card reader; (b) an account database, the account database having a multiplicity of card holder account numbers stored therein; (c) an account programming device, the account programming device capable of reading one new user account number from the account database and writing a new account number on the first programmable memory; whereby when the card is placed is communication with the account programming device a card holder account number is read from the account database and is written onto the first programmable memory such that the card is useable by a card holder as a personal authorization card.

Other embodiments include the following (presented in the form of claims, but not intended to act as or be read as a claims limiting the invention):

1. A personal authorization card for storing access to account information comprising:

a planar card, the planar card having the dimensions and functionality of a credit card; a first programmable magnetic stripe affixed on the planar card, the first programmable magnetic stripe readable by a current card reader; an account database, the account database having a multiplicity of new card holder account numbers; an account programming device, the account programming device capable of reading one new user account number from the account database and writing a new account number on the first programmable magnetic stripe; wherein when the planar card is inserted in the account programming device a new card holder account number is read from the account database and is written on the first programmable magnetic stripe; such that the planar card is operable by a card holder as a personal authorization card.

2. The personal authorization card for storing access to account information as in claim 1 wherein the account programming device selected from a group consisting of:

standalone electronic devices, cellular phones, personal data assistants (PDA's), personal computers.

3. The personal authorization card for storing access to account information as in claim 1 wherein the planar card further comprising: an account database, the account database integrated onto the planar card; a new card holder account number selector, the new card holder account number selector capable of interfacing with the account database and operable by the card holder to select the new card holder account number; such that when the new card holder account number selector is operated, the user selects an account number that is then written on the first programmable magnetic stripe.

4. The personal authorization card for storing access to account information as in claim 3 wherein the account database is passively powered.

5. The personal authorization card for storing access to account information as in claim 3 wherein the account number selector is a touch screen.

6. The personal authorization card for storing access to account information as in claim 1 wherein the personal authorization card is selected from a group consisting of credit cards, bank ATM cards, department store cards, club membership cards, rebate cards, medical/insurance cards, drivers licenses, and calling cards.

7. The personal authorization card for storing access to account information as in claim 1 wherein the new card holder account numbers are encrypted.

8. The personal authorization card for storing access to account information as in claim 1 wherein the account programming device is selected from a group consisting of host computer systems, local computer systems, network based computer systems, portable data systems, and mobile data systems.

9. The personal authorization card for storing access to account information as in claim 1 wherein the account database is stored on a non-volatile memory.

10. The personal authorization card for storing access to account information as in claim 1 wherein the device further comprises: a unique identification number, such that the unique identification number corresponds to a card holder.

11. The personal authorization card for storing access to account information as in claim 1 where the account database is alterable by a third party.

12. The personal authorization card for storing access to account information as in claim 1 further comprising: a user id and password pair, such that the user id and password pair allows limited access by the account programming device.

13. The personal authorization card for storing access to account information as in claim 1 further comprising: a bio-matrix scanner, the bio-matrix scanner being coupled to the account database; such that when a biometric signature from the card holder is matched to an accepted card holder the card holder account number is retrieved from the account database.

14. A method for generating electronic transactions by a card holder comprising:

obtaining a card, the card being generally planar and possessing a first programmable magnetic stripe such that the first programmable magnetic stripe is readable by a current card reader; and coupling the card an account programming device, the account programming device capable of reading one new user account number from an account database and writing a new account number on the first programmable magnetic stripe; and selecting a new card holder account number from the account database; so that when the card is inserted into a card reader, the card reader reads the new user account number.

15. The method for generating electronic transactions by a card holder as in claim 14, further comprising the step of establishing a secured information transmission between the account programming device and the account database.

16. The method for generating electronic transactions by a card holder as in claim 14, further comprising the step of encrypting the account database.

17. A system for generating electronic transactions by a card holder comprising:

a magnetic stripe, the magnetic stripe integrated onto a generally planar card; and a means for selecting from a database of multiple account numbers generally related to a card holder, a single account number; a means for encoding account information on the magnetic stripe; a means for transmitting the single account onto the magnetic stripe using the encoding means.

18. A personal authorization card with a unique account number embedded on a magnetic stripe on the card, created by the process comprising the steps of:

accessing a database of multiple account numbers from a multiplicity of card issuers, wherein the account numbers are related to a single cardholder; selecting a single account number from the database of multiple account numbers; encoding the single account number on the magnetic stripe; such that personal authorization card is compatible with existing point of sale machines.

19. The personal authorization card as in claim 18 further comprising the steps of:

embedding the database of multiple account numbers on the card; attaching an external device to the card; reading an account number from the database of multiple account numbers on the card; writing the account number onto the magnetic stripe; so that the personal authorization card is readable by existing point of sale machines.

DEFINITIONS

In this disclosure, the following definitions are used.

A "One card ID" means a unique string of characters that is uniquely associated with a unique DEVICE ID, such as an ip address.

A "Device ID" is a unique string of characters that is associated with a unique device.

"Characters" may be any letters, numbers, pictograms, kanji, or symbols.

A "device memory" includes any storage accessible by the device including non-volatile memory on or off the device, non-volatile memory on the card, or a remote storage or database.

A "transaction memory" includes any storage device including magnetic stripes, RFID tags, smart card, non-volatile memory, etc.

To "change the functionality of a card" means to change the way the card works or change what it does in any way, or to change, edit, add or delete data from the card; this may include but is not limited to, for example, activating the card, deactivating the card, extend or change the expiration date of the card, changing address, credit limit, or changing authorized users of the card.

A "Customer" may be any person or legal entity such as a corporation.

The term "account" refers to any body if information specific to a person or entity, such as a corporation, and may be a credit or debit account, or may be an account having information for a customer loyalty card, insurance card, club membership card or drivers license. Any type of information may be stored in an account.

A "Card" may be any physical entity capable of including a memory, such as a credit or debit card, a customer loyalty card, insurance card, club membership card or drivers license, and may be of any shape but generally refers to a flat card with dimensions similar to a credit card, although the term is used to equally include any device of any shape.

A "programming device" means any machine that can program a memory, such as a read/write device for reading and writing to and from a magnetic memory or a non-volatile memory.

A "Host system" can be any centralized card processor such as First Data Corp., Total System, a new created card processor for One-Card System, or any other institution chosen to perform the function of facilitating communication in the one card system. It adds another layer of security and convenience.

The phrase "encoding" or "writing" information onto the memory of the card simply means transferring or writing information onto a memory.

A "new card" simply means a card that is new to the user/customer.

The "One-Card System" refers to the invention as shown and described herein.

"New account information" means any account information such as account number, expiration date, account holder name, address, etc. that is new to the user/customer.

"Contacting the card to the Device" means putting the card and Device in functional communication, and not necessarily physical communication. No physical communication is required and the card and Device may be remote from each other.

The phrase "account database" means any set of stored information stored in a memory, for example stored in a RAM in the Device.

The term "device memory" means a memory on the device.

The term "transaction memory" refers to a memory on the card.

General Representations Concerning the Disclosure

In this specification, reference is made to particular features of the invention (including for example components, elements, devices, apparatus, systems, groups, ranges, method steps, test results, etc.). [It is to be understood that the disclosure of the invention in this specification includes all appropriate combinations of such particular features. For example, where] *Where* a particular feature is disclosed in the context of a particular embodiment or a particular claim, that feature can also be used, to the extent appropriate, in the context of other particular embodiments and claims, and in the invention generally. The embodiments disclosed in this specification are exemplary and do not limit the invention. Other embodiments can be utilized and changes can be made. [As used in this specification, the singular forms "a", "an", and "the" include plural reference unless the context clearly dictates otherwise. Thus, for example, a reference to "a part" includes a plurality of such parts, and so forth.] The term "comprises" and grammatical equivalents thereof are used in this specification to mean that, in addition to the features specifically identified, other features are optionally present. For example, a device "comprising" (or "which comprises") elements A, B and C can contain only elements A, B and C, or can contain not only elements A, B and C but also one or more other elements. The term "consisting essentially of" and grammatical equivalents thereof is used herein to mean that, in addition to the features specifically identified, other features may be present which do not materially alter the claimed invention. The term "at least" followed by a number is used herein to denote the start of a range beginning with that number. Where reference is made in this specification to a method comprising two or more defined steps, the defined steps can be carried out in any order or simultaneously (except where the context excludes that possibility), and the method can optionally include one or more other steps which are carried out before any of the defined steps, between two of the defined steps, or after all the defined steps (except where the context excludes that possibility). Where reference is made herein to "first" and "second" features, this is generally done for identification purposes; unless the context requires otherwise, the first and second features can be the same or different, and reference to a first feature does not mean that a second feature is necessarily present (though it may be present). Numbers given herein should be construed with the latitude appropriate to their context and expression; for example, each number is subject to variation which depends on the accuracy with which it can be measured by methods conventionally used by those skilled in the art. [This specification incorporates by reference all documents referred to herein and all documents filed concurrently with this specification or filed previously in connection with this application, including but not limited to such documents which are open to public inspection with this specification.]

The invention claimed is:

[1. A method for establishing account information into a device comprising:

(a) storing one or more user account information on a device, wherein the device includes a unique identification number stored thereon and known to a card issuer;

(b) encoding user account information onto a memory of a card using said device;

(c) receiving by the card issuer, a request from a user for a new card or to make changes to an existing card;

(d) sending by the card issuer, an encrypted new account information to the device using the unique identification number of the device, wherein only the device with the unique identification number is configured to decrypt the new account information;

(e) decrypting the encrypted new account information using the unique device identification number, and storing the account information to an account database on a memory of the device;

(f) selecting an account from the account database on the memory of the device and writing the selected account information onto the memory of the card; and (g) using the card with the selected account information to complete a next transaction.]

[2. The method of claim 1 further comprising the steps of (h) upon receipt of the new account information, prompting the customer to contact the card issuer for verification of customer's identity; and (i) inputting by the customer, verification information to allow authorization by the card issuer activate or change of functionality of the card.]

[3. The method of claim 1 comprising, in step (d), further encrypting the new account information with a pass-code that is required to decrypt the new account information, and further comprising the step of; receiving the new account information, whereupon the device prompts the customer to contact the card issuer, and the customer contacts the card issuer to verify the customer's identity and to obtain the pass-code required to decrypt the account information.]

[4. A method for establishing account information into a device comprising:

(a) storing one or more user account information on a device, wherein the device includes a unique identification number stored thereon;

(b) encoding user account information onto a memory of a card using said device;

(c) establishing a unique one-card identification number known to the customer and a card issuer, wherein the unique one-card identification number is associated with and allowing access to the device;

(d) registering the one-card identification number and the device identification number with a host system;

(e) communicating, from the customer to the card issuer, an instruction to issue a new card or change the functionality of a card via the host system;

(f) in response to the communicating step, simultaneously sending by the card issuer, encrypted new account information and the one-card identification number associated to the account information, to the host system;

(g) identifying by the host system the device identification number using the one-card identification number;

(h) identifying the device using the device identification number;

(i) upon identifying the device, further encrypting by the host system, the encrypted new account information using device-specific encryption which can be decrypted only by a device having the corresponding device identification number;

(j) forwarding by the host system, the device-specific encrypted new account information to the device;

(k) receiving by the device, the device-specific encrypted new account information;

(l) decrypting by the device, the device-specific encrypted new account information using the corresponding device identification number;

(m) storing the decrypted new account information to the account database on a memory of the device;

(n) selecting an account from the account database on the device memory; and (o) writing the selected account information onto the memory of the card.]

[5. The method of claim 1 or 4 further comprising the steps of using the un-encrypted account information to activate or change the functionality of the card.]

[6. The method of claim 4 further comprising the steps of upon receipt of the device-specific encrypted new account information, prompting the customer to contact the card issuer for verification of customer's identity; and inputting by the customer, verification information to allow authorization by the card issuer activate or change of functionality of the card; and the account information sending from the card issuer in step (f) is further encrypted with a pass-code, and upon receipt of the device-specific new account information, the device prompts the customer to contact the card issuer, the customer contacts the card issuer to verify the customer's identity to get the pass-code to decrypt the account information.]

[7. The method of claim 4 wherein the host system does not retain or store unencrypted account information.]

[8. The method of claim 1 or 4 further comprising storing the account information on the device in an encrypted form.]

[9. The method of claim 8 wherein the encrypted account information is only decrypted or viewed or used by entering either a correct password or a bio-metric information or both.]

[10. The method of claim 4 wherein, following decryption of the device-specific new account information, the user can view the account information stored in the device including information selected from the group consisting of: the name of issuing bank, the current balance of the account, and available credit.]

[11. The method of claim 1 or 4 further comprising the steps of the card issuer communicating an instruction to the customer for changing the functionality of a card in step (d) of claim 1, or in step (f) of claim 4, without the request of the customer.]

[12. The method of claim 1 or 4 wherein, following decryption of the account information, a bar code is displayed on the device.]

[13. The method of claim 1 or 4 further comprising physically contacting the card with the device and erasing account information from the card.]

[14. The method of claim 1 or 4 wherein account information stored on the transaction memory of the card is erased after a pre-set time.]

[15. The method of claim 4 further comprising the steps of the customer obtaining a new device, contacting the host system for card cancellation, registering the new device with the host system to establish a link between their new device and their one card identification number.]

[16. The method of claim 1 or 4 wherein the card comprises a programmable magnetic stripe.]

[17. The method of claim 1 or 4 wherein the card comprises a programmable smart card.]

[18. The method of claim 1 or 4 wherein the device comprises a smart card chip such that the device can function as a smart card by itself.]

[19. The method of claim 1 wherein, following decryption of the new account information, the user can view the account information stored in the device including information selected from the group consisting of: the name of issuing bank, the current balance of the account, and available credit.]

*20. A method for establishing account information into a device comprising:*

*a) providing an interface allowing a user to request, from a card issuer, a new card or changes to an existing card;*

*b) receiving a request to store user account information on the device, wherein the device includes a unique identification number stored thereon;*

*c) encoding user account information onto a memory of a card using the device;*

*d) receiving encrypted new account information sent by the card issuer to the device using the unique identification number on the device, wherein only the device with the unique identification number is configured to decrypt the new account information;*

*e) decrypting the encrypted new account information using the unique identification number, and storing the account information;*

*f) providing an interface allowing the user to select account information; and*

*g) writing the selected account information onto the memory of the card.*

*21. The method of claim 20, further comprising the steps of*

*(h) upon receipt of the new account information, prompting the customer to contact the card issuer for verification of customer's identity; and*

*(i) receiving, from the customer, verification information to allow authorization by the card issuer to activate or change the functionality of the card.*

*22. The method of claim 20, comprising, in step (d), further encrypting the new account information with a pass-code that is required to decrypt the new account information, and further comprising the step of; receiving the new account information, whereupon the device prompts the customer to contact the card issuer to obtain the pass-code required to decrypt the account information.*

*23. A method for establishing account information into a device comprising:*

*a) providing an interface allowing a user to communicate to a card issuer an instruction to issue a new card or change the functionality of a card via a host system;*

*b) receiving a request to store user account information on the device, wherein the device includes a unique identification number stored thereon;*

*c) encoding user account information onto a memory of a card using the device;*

*d) establishing a unique one-card identification number, wherein the unique one-card identification number is associated with and allowing access to the device;*

*e) receiving, from the card issuer, encrypted new account information and the unique onecard identification number associated with the account information;*

*f) identifying the unique identification number using the unique one-card identification number;*

*g) identifying the device using the unique identification number;*

*h) upon identifying the device, further encrypting the encrypted new account information using device-specific encryption which can be decrypted only by a device having the corresponding unique identification number;*

*i) forwarding the device-specific encrypted new account information to the device;*

*j) receiving, at the device, the device-specific encrypted new account information;*

*k) decrypting, at the device, the device-specific encrypted new account information using the corresponding unique identification number;*

*l) storing the decrypted new account information;*

*m) providing an interface allowing the user to select account information;*

*n) identifying a selected account; and*

*o) writing the selected account information onto the memory of the card.*

*24. The method of claim 20 or 23, further comprising the steps of using the unencrypted account information to activate or change the functionality of the card.*

*25. The method of claim 23, further comprising the steps of: prompting the customer to contact the card issuer for verification of customer's identity upon receipt of the device-specific encrypted new account information; providing an interface to allow the user to input verification information to enable authorization by the card issuer to activate or change the functionality of the card; and prompting the customer to contact the card issuer upon receipt of the device-specific new account information.*

*26. The method of claim 23, wherein the unencrypted account information is not stored.*

*27. The method of claim 20 or 23, further comprising storing the account information on the device in an encrypted form.*

*28. The method of claim 27, wherein the encrypted account information is decrypted or viewed or used by entering a correct password.*

*29. The method of claim 27, wherein the encrypted account information is decrypted or viewed or used by entering biometric information.*

*30. The method of claim 20 or 23, wherein, following decryption of the device-specific new account information, providing an interface allowing the user to view the account information stored in the device including information selected from the group consisting of: the name of issuing bank, the current balance of the account, and available credit.*

*31. The method of claim 20 or 23, wherein, following decryption of the account information, a bar code is displayed on the device.*

*32. The method of claim 20 or 23, further comprising the step of physically contacting the card with the device and erasing account information from the card.*

*33. The method of claim 20 or 23, wherein account information stored on the memory of the card is erased after a pre-set time.*

*34. The method of claim 23, further comprising the steps of: receiving a request from the user for card cancellation, registering a new device with the host system to establish a link between the new device and the user's unique one-card identification number.*

*35. The method of claim 20 or 23, wherein the card comprises a programmable magnetic stripe.*

*36. The method of claim 20 or 23, wherein the card comprises a programmable smart card.*

*37. The method of claim 20 or 23, wherein the device comprises a smart card chip such that the device can function as a smart card by itself.*

*38. A mobile computing device comprising a processor, an operating system, a memory, a wireless communications element, and instructions executed by the processor to provide an application, the application comprising:*

*a) a software module configured to provide an interface allowing a user to request, from a card issuer, a new card or changes to an existing card;*

*b) a software module configured to receive a request to store user account information on the device, wherein the device includes a unique identification number stored thereon;*

*c) a software module configured to encode user account information onto a memory of a card using the device;*

*d) a software module configured to receive encrypted new account information sent by the card issuer to the device using the unique identification number of the device, wherein only the device with the unique identification number is configured to decrypt the new account information;*

*e) a software module configured to decrypt the encrypted new account information using the unique identification number and store the account information;*

*f) a software module configured to provide an interface allowing the user to select account information; and*

*g) a software module configured to write the selected account information onto the memory of the card.*

*39. The device of claim 38, wherein the software module configured to receive encrypted new account information, upon receipt of the new account information, is further configured to prompt the customer to contact the card issuer for verification of customer's identity and receive, from the customer, verification information to allow authorization by the card issuer to activate or change the functionality of the card.*

*40. The device of claim 38, wherein the software module configured to receive encrypted new account information is further configured to encrypt the new account information with a pass-code that is required to decrypt the new account information, and prompt the customer to contact the card issuer to obtain the pass-code required to decrypt the account information.*

*41. The device of claim 38, wherein the application further comprises a software module configured to use the unencrypted account information to activate or change the functionality of the card.*

*42. The device of claim 38, wherein the software module configured to receive encrypted new account information is further configured to prompt the customer to contact the card issuer for verification of customer's identity upon receipt of the encrypted new account information; provide an interface to allow the user to input verification information to enable authorization by the card issuer to activate or change the functionality of the card; and prompt the customer to contact the card issuer upon receipt of the new account information.*

*43. The device of claim 38, wherein the unencrypted account information is not stored.*

*44. The device of claim 38, wherein the software module configured to store the account information on the device stores the account information in an encrypted form.*

*45. The device of claim 44, wherein the encrypted account information is decrypted or viewed or used by entering a correct password.*

*46. The device of claim 44, wherein the encrypted account information is decrypted or viewed or used by entering biometric information.*

*47. The device of claim 38, wherein the software module configured to decrypt the encrypted new account information is further configured to, following decryption of the new account information, provide an interface allowing the user to view the account information stored in the device including information selected from the group consisting of: the name of issuing bank, the current balance of the account, and available credit.*

*48. The device of claim 38, wherein the software module configured to decrypt the encrypted new account information is further configured to, following decryption of the account information, display a bar code on the device.*

*49. The device of claim 38, wherein the application further comprises a software module configured to erase account information from the card upon physical contact between the card and the device.*

*50. The device of claim 38, wherein account information stored on the memory of the card is erased after a pre-set time.*

*51. The device of claim 38, wherein the application further comprises a software module configured to receive a request from the user for card cancellation and register a new device with the host system to establish a link between the new device and the user's unique identification number.*

*52. The device of claim 38, wherein the card comprises a programmable magnetic stripe.*

*53. The device of claim 38, wherein the card comprises a programmable smart card.*

*54. The device of claim 38, wherein the device comprises a smart card chip such that the device can function as a smart card by itself.*

*55. A server comprising a processor, an operating system, a memory, a communications element, and instructions executed by the processor to provide a host system application, the application comprising:*

*a) a software module configured to receive a request to store user account information on a device, wherein the device includes a unique identification number stored thereon;*

*b) a software module configured to establish a unique one-card identification number wherein the unique one-card identification number is associated with and allowing access to the device;*

*c) a software module configured to receive, from the card issuer, encrypted new account information and the unique one-card identification number associated with the account information;*

*d) a software module configured to identify the unique identification number using the unique one-card identification number;*

*e) a software module configured to identify the device using the unique identification number;*

*f) a software module configured to, upon identifying the device, further encrypt the encrypted new account information using device-specific encryption which can be decrypted only by a device having the corresponding unique identification number; and*

*g) a software module configured to forward the device-specific encrypted new account information to the device such that it can be decrypted, stored, and written onto the memory of a card.*

*56. The server of claim 55, wherein the software module configured to receive encrypted new account information, upon receipt of the new account information, is further configured to prompt the customer to contact the card issuer for verification of customer's identity and receive, from the customer, verification information to allow authorization by the card issuer to activate or change the functionality of the card.*

*57. The server of claim 55, wherein the software module configured to receive encrypted new account information is further configured to encrypt the new account information with a passcode that is required to decrypt the new account information, and prompt the customer to contact the card issuer to obtain the pass-code required to decrypt the account information.*

*58. The server of claim 55, wherein the software module configured to receive encrypted new account information is further configured to prompt the customer to contact the card issuer for verification of customer's identity upon receipt of the encrypted new account information; provide an interface to allow the user to input verification information to enable authorization by the card issuer to activate or change the functionality of the card; and prompt the customer to contact the card issuer upon receipt of the device-specific new account information.*

*59. The server of claim 55, wherein unencrypted account information is not stored.*

*60. A method for establishing account information into a device comprising:*

*(a) storing one or more user account information on a device, wherein the device includes a unique identification number stored thereon and known to a card issuer;*

*(b) encoding user account information onto a memory of a card using said device;*

*(c) receiving by the card issuer, a request from a user for a new card or to make changes to an existing card;*

*(d) sending by the card issuer, an encrypted new account information to the device using the unique identification number of the device, wherein only the device with the unique identification number is configured to decrypt the new account information;*

*(e) decrypting the encrypted new account information using the unique device identification number, and storing the account information to an account database on a memory of the device;*

(*f*) *selecting an account from the account database on the memory of the device and writing the selected account information onto the memory of the card; and*

(*g*) *using the card with the selected account information to complete a next transaction.*

*61. The method of claim 60 further comprising the steps of* (*h*) *upon receipt of the new account information, prompting the customer to contact the card issuer for verification of customer's identity; and* (*i*) *inputting by the customer, verification information to allow authorization by the card issuer activate or change of functionality of the card.*

*62. The method of claim 60 comprising, in step* (*d*), *further encrypting the new account information with a pass-code that is required to decrypt the new account information, and further comprising the step of; receiving the new account information, whereupon the device prompts the customer to contact the card issuer, and the customer contacts the card issuer to verify the customer's identity and to obtain the pass-code required to decrypt the account information.*

*63. The method of claim 60 further comprising the steps of using the un-encrypted account information to activate or change the functionality of the card.*

*64. The method of claim 60 further comprising storing the account information on the device in an encrypted form.*

*65. The method of claim 64 wherein the encrypted account information is only decrypted or viewed or used by entering either a correct password or a bio-metric information or both.*

*66. The method of claim 60 further comprising the steps of the card issuer communicating an instruction to the customer for changing the functionality of a card in step* (*d*) *of claim 60, without the request of the customer.*

*67. The method of claim 60 wherein, following decryption of the account information, a bar code is displayed on the device.*

*68. The method of claim 60 further comprising physically contacting the card with the device and erasing account information from the card.*

*69. The method of claim 60 wherein account information stored on the transaction memory of the card is erased after a pre-set time.*

*70. The method of claim 60 wherein the card comprises a programmable magnetic stripe.*

*71. The method of claim 60 wherein the card comprises a programmable smart card.*

*72. The method of claim 60 wherein the device comprises a smart card chip such that the device can function as a smart card by itself.*

*73. The method of claim 60 wherein, following decryption of the new account information, the user can view the account information stored in the device including information selected from the group consisting of: the name of issuing bank, the current balance of the account, and available credit.*

*74. A method for establishing account information into a device comprising:*

(*a*) *storing one or more user account information on a device, wherein the device includes a unique identification number stored thereon;*

(*b*) *encoding user account information onto a memory of a card using said device;*

(*c*) *establishing a unique one-card identification number known to the customer and a card issuer, wherein the unique one-card identification number is associated with and allowing access to the device;*

(*d*) *registering the one-card identification number and the device identification number with a host system;*

(*e*) *communicating, from the customer to the card issuer, an instruction to issue a new card or change the functionality of a card via the host system;*

(*f*) *in response to the communicating step, simultaneously sending by the card issuer, encrypted new account information and the one-card identification number associated to the account information, to the host system;*

(*g*) *identifying by the host system the device identification number using the one-card identification number;*

(*h*) *identifying the device using the device identification number;*

(*i*) *upon identifying the device, further encrypting by the host system, the encrypted new account information using device-specific encryption which can be decrypted only by a device having the corresponding device identification number;*

(*j*) *forwarding by the host system, the device-specific encrypted new account information to the device;*

(*k*) *receiving by the device, the device-specific encrypted new account information;*

(*l*) *decrypting by the device, the device-specific encrypted new account information using the corresponding device identification number;*

(*m*) *storing the decrypted new account information to the account database on a memory of the device;*

(*n*) *selecting an account from the account database on the device memory; and*

(*o*) *writing the selected account information onto the memory of the card.*

*75. The method of claim 74 further comprising the steps of using the un-encrypted account information to activate or change the functionality of the card.*

*76. The method of claim 74 further comprising the steps of upon receipt of the device-specific encrypted new account information, prompting the customer to contact the card issuer for verification of customer's identity; and inputting by the customer, verification information to allow authorization by the card issuer activate or change of functionality of the card; and the account information sending from the card issuer in step* (*f*) *is further encrypted with a pass-code, and upon receipt of the device-specific new account information, the device prompts the customer to contact the card issuer, the customer contacts the card issuer to verify the customer's identity to get the pass-code to decrypt the account information.*

*77. The method of claim 74 wherein the host system does not retain or store unencrypted account information.*

*78. The method of claim 74 further comprising storing the account information on the device in an encrypted form.*

*79. The method of claim 78 wherein the encrypted account information is only decrypted or viewed or used by entering either a correct password or a bio-metric information or both.*

*80. The method of claim 74 wherein, following decryption of the device-specific new account information, the user can view the account information stored in the device including information selected from the group consisting of: the name of issuing bank, the current balance of the account, and available credit.*

*81. The method of claim 74 further comprising the steps of the card issuer communicating an instruction to the customer for changing the functionality of a card in step* (*f*) *of claim 74, without the request of the customer.*

*82. The method of claims 74 wherein, following decryption of the account information, a bar code is displayed on the device.*

*83. The method of claim 74 further comprising physically contacting the card with the device and erasing account information from the card.*

*84. The method of claim 74 wherein account information stored on the transaction memory of the card is erased after a pre-set time.*

*85. The method of claim 74 further comprising the steps of the customer obtaining a new device, contacting the host system for card cancellation, registering the new device with the host system to establish a link between their new device and their one card identification number.*

*86. The method of claim 74 wherein the card comprises a programmable magnetic stripe.*

*87. The method of claim 74 wherein the card comprises a programmable smart card.*

*88. The method of claim 74 wherein the device comprises a smart card chip such that the device can function as a smart card by itself.*

* * * * *